United States Patent Office 3,523,192
Patented Aug. 4, 1970

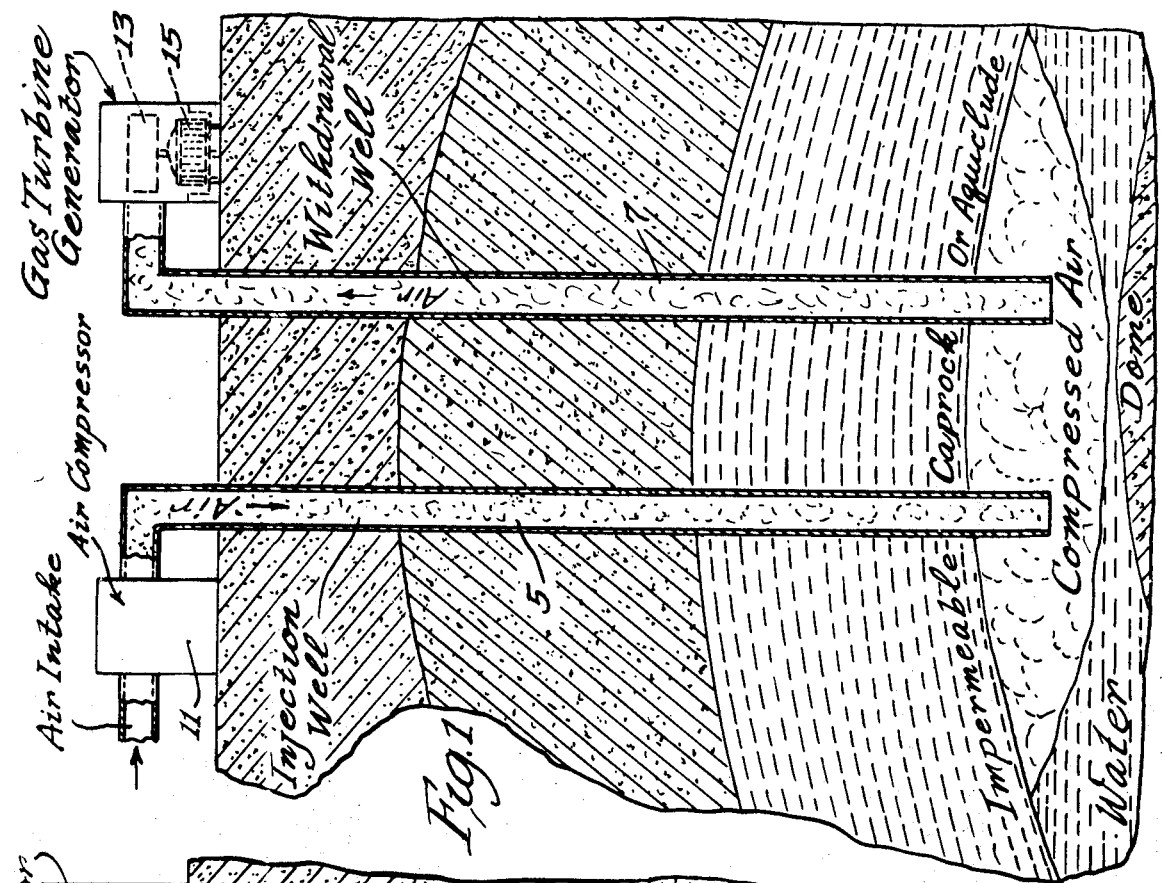
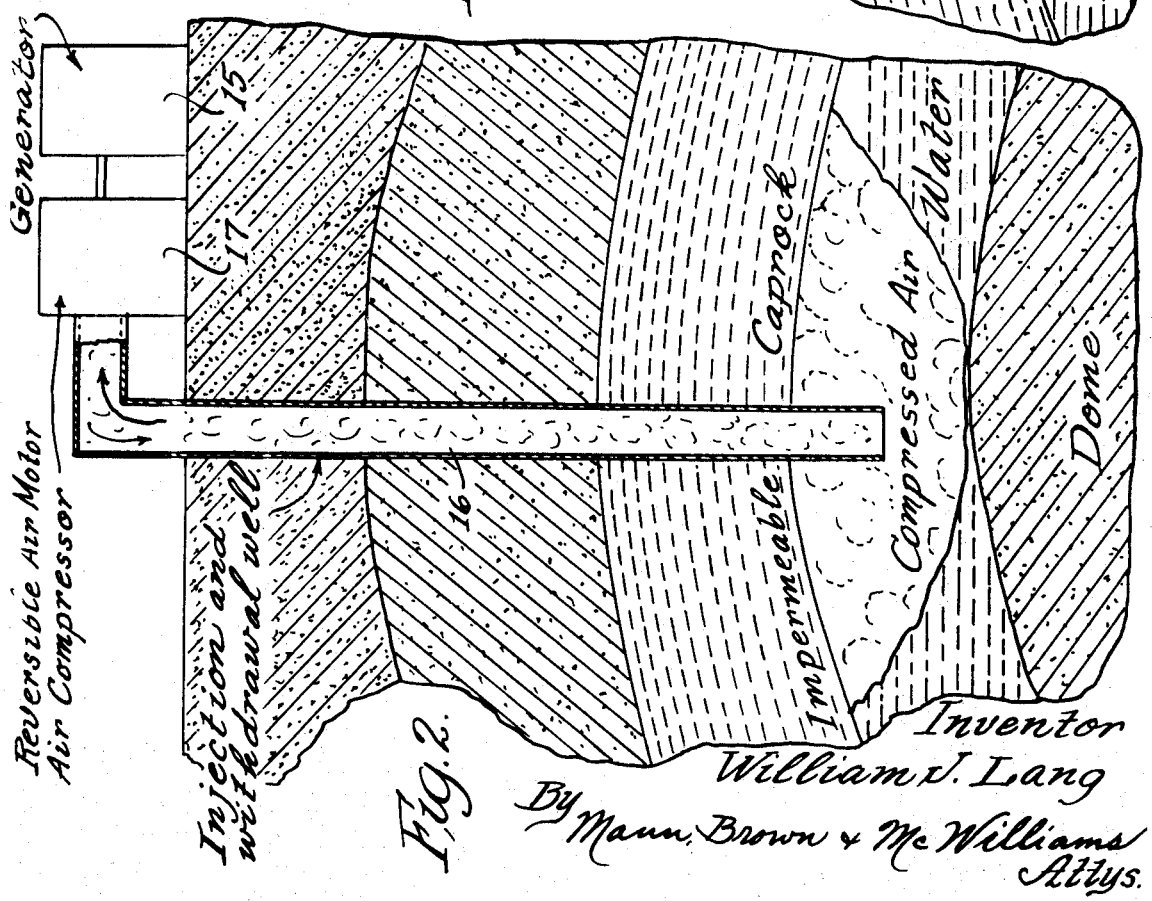

3,523,192
METHOD AND APPARATUS FOR INCREASING THE EFFICIENCY OF ELECTRIC GENERATION PLANTS
William J. Lang, Mundelein, Ill.
(623 Dawes, Libertyville, Ill. 60048)
Filed Feb. 14, 1968, Ser. No. 705,546
Int. Cl. H02k 7/18
U.S. Cl. 290—52                6 Claims

ABSTRACT OF THE DISCLOSURE

Excess electric power available during period of low load factor is utilized to pump air or other gas into a natural, barren or depleted aquifer underground storage reservoir having a porosity and permeability sufficiently high to enable the gas to be pumped into the formation against the existing hydrostatic pressure without significantly increasing reservoir pressure. Upon peak load demand the gas is withdrawn from the reservoir and utilized to operate an air motor, turbine or other prime mover which in turn operates the generator. Substantially no loss of pressure in the reservoir is experienced during withdrawal of the gas and no loss of existing gas pressure is experienced and the pressure of the gas feed from the reservoir to the prime mover is substantially constant.

BRIEF SUMMARY OF THE INVENTION

It is known that the cost and efficiency of electrical power generation can be improved in certain areas by an integrated operation of a primary and auxiliary generating systems. Where irregular demand would impose a low load factor on a single generating system a smaller auxiliary system is often used to improve the load factor and efficiency of the primary system which produces the majority of the load. Such a system provides additional power during peak demand periods, a valuable ready reserve, and a source of emergency power. Various power sources are used to drive the auxiliary generating systems including pumped hydro-storage and compressed air storage. Low cost electrical power is used to pump water into elevated storage or to compress air for storage in mined underground salt cavities. The elevated water or compressed air is later used as a source of energy for driving power generating systems during peak demand periods. The resulting auxiliary power is therefore produced at a higher incremental cost as a result of energy lost in conversion but may provide overall cost reductions for electrical generation for the integrated system. Overall cost reductions of as much as 30% in electricity generation have been reported by use of combined systems of thermal generating plants with pumped hydro-storage auxiliary generating systems. The savings result from improving the load factor of primary generating plant, providing valuable and required ready reserves and deferring the need for expansion of the base load generating system. Energy storage-type auxiliary systems may serve an additional valuable function by absorbing surplus power during sudden load changes for maintaining frequency stability of the electrical output of the primary generating and distribution system. A further important consideration is the incalculable value of auxiliary systems as emergency generating sources during power failures.

My invention utilizes natural underground artesian aquifers or depleted natural liquid or gaseous hydrocarbon reservoirs, i.e., porous rock formations of relatively high porosity and permeability to provide storage into which compressed air or other gas can be injected, stored, and reclaimed for later use. The pore spaces of such reservoirs are commonly occupied by water which may be displaced by injecting compressed gas at pressures slightly in excess of natural hydrostatic pressure. Reservoirs of this type are known which are capable of storing as much as several billion cubic feet, and gas can be injected or withdrawn at a relatively constant pressure as regulated by the natural hydrostatic pressure of the formation. The reservoir acts like a large elastic chamber, expanding and contracting to accommodate the amount of gas stored due to the movement of water caused by injection and withdrawal of gas. Thus, gas can be compressed and stored during periods of low electrical demand or when low cost electrical power is available and withdrawn under substantially constant pressure during high electrical demand periods to run a prime mover as a power supply for electrical generation or serve other work or chemical functions. The expense of construction for such a secondary power generating system is greatly reduced over existing methods of constructing surface reservoirs as in the case of pumped hydro-storage peak generating units or excavated underground storage of compressed air in salt formations. Site availability for developing the described storage and secondary generating systems is limited to areas where favorable conditions exist but are more abundant and widespread geographically than either sites suitable for pumped hydro-storage systems of salt cavity, compressed air systems. Where conditions are favorable as to the locations of the primary power plant, secondary storing-generating system and load centers, my invention will improve the economies over a power plant by improving the load factor of existing distribution systems and deferring construction of additional distribution capacity. Reservoir pressures of about 40 to 3000 lbs. per square inch are suitable for the purposes of this invention.

BRIEF DESCRIPTION OF THE DRAWING

FIG. 1 is a diagrammatic view partly in elevation and partly in cross-section illustrating the invention in which separate wells are used for injection and withdrawal of gas; and FIG. 2 is a similar view illustrating the invention using a single well for both injection and withdrawal.

DETAILED DESCRIPTION OF THE INVENTION

Referring to FIG. 1, the numeral 1 indicates a subterranean reservoir of relatively high porosity and permeability. The reservoir can be a petroleum-barren aquifer, that is, a geological dome or anticline in which no commercial quantity of oil or gas has been produced prior to the storage operation, or the facility may be a depleted oil or gas field. It is an essential characteristic of the aquifer storage reservoir that it have a tight cap rock over the reservoir in order to prevent leakage of gas therefrom. A description of suitable gas storage reservoirs and the methods by which they are evaluated was presented in paper No. SPE 162 entitled, "Evaluation of Underground Gas Storage Conditions in Aquifers Through Investigation of Groundwater in Hydrology," delivered before the Society of Petroleum Engineers of AIME during the 36th Annual Fall Meeting in Dallas, October 1961. The requirements for suitable underground storage reservoirs are set forth in Bureau of Mines Circular 77,654, in Section XXV, entitled, "Underground Storage of Natural Gas in Coal-Mining Areas," by Wheeler and Eckard, particularly at pages 6 and 7. It is preferred but not essential that the type of confined porous rock reservoir be of the type frequently referred to as a "water sand," i.e., a storage reservoir freely interconnected with a confined hydrological system under hydrostatic pressure. Storage of gas in water sand reservoirs, as described by Douglas Ball and Peter Burnett in the paper "Storage of Gas in Water Sands," pages 68–72, the Mines Magazine, vol. 49, November 1959, is particularly desirable because of the pressure normalizing effect of the hydrological system. At reservoir locations where geological structures persist through a thick sequence of strata several suitable reservoir strata may exist and permit simultaneous storage operations in more than one strata. When multiple zone storage is utilized an exchange or recycling of gas from one zone to another may be desirable to improve or maintain efficiencies of the storage system. Such a multiple zone underground gas storage system is operated by Natural Gas Storage Company of Illinois at Herscher, Illinois and described in "Underground Storage of Natural Gas in Illinois," by Alfred H. Bell and published by Illinois State Geological Survey, 1961, Circular 318.

Referring to FIG. 1, the numeral 3 represents the cap rock of shale or other gas impermeable rock which overlies the aquifer or other storage reservoir. The numeral 5 represents an injection well, and the numeral 7 represents the withdrawal or output well. Air or other gas is fed through line 9 to compressor 11 and injected through well 5 under pressure sufficiently high to overcome the hydrostatic pressure in the reservoir. For example, if the hydrostatic pressure in the reservoir is 250 lbs., the air will be compressed to a pressure exceeding the hydrostatic pressure by a factor at least sufficient to initiate displacement of the water. Generally, a pressure excees of 10 percent will be sufficient.

Air compressor 11 is operated by electricity supplied from a power plant such as a hydroelectric or steam generating plant. In practice, air is compressed and injected through well 5 only during periods of off-peak load when the demand for electricity is below the capacity of the hydroelectric or steam generating plant.

Air stored in the reservoir 1 under existing hydrostatic pressure is withdrawn through line 7 as required. Withdrawal may be simultaneous with injection, or may occur only during periods when air is not being injected, depending on the purpose for which the withdrawn air is used. For example, if the air is used for purposes other than electric generating equipment at the power plant, such as heat transfer, steel melting furnaces, and in gas turbines for cooling and combustion, it may be withdrawn at any time that the load requirements dictate. On the other hand, if the air is to be used to motivate additional electrical generating equipment during periods of peak load, the air will be withdrawn during high load periods when air is not being injected through well 5, since the electrical generating capacity will be required to meet the electrical demand and will not be available for compressing air for injection into the reservoir. If the system is used for supplementing the output of a hydroelectric, steam, diesel engine or other electrical generating plant during high load periods, injection and withdrawal of gas can be effected through a single well.

Air or other gas withdrawn through well 7 can be used to motivate a prime mover 13 such as a turbine or air motor which, in turn, can be made to do useful work or used to drive additional electrical generating equipment 15. Suitable air motors for driving electrical generators are described at pp. 275 to 305 of "Compresses-Air Plant," 5th ed., by Robert Peele, published 1930 by John Wiley & Sons, New York.

An alternate to the described method is that illustrated in FIG. 2 in which one well 16 serves both for injection and withdrawal of the compressed gas and a combination compressor-air motor 17 is used both for compression and also gas expansion to drive generator 15. One such device, the rotary screw, which will serve for the air compression and the air motor to drive the generator, is described by Whitehouse, Council and Martinez, in "Peaking Power With Air," Power Engineering, January 1968, pp. 50–52.

Rock strata having a porosity of at least 6 percent and as high as 40 percent, and a permeability of at least 5 millidarcies and as high as 50,000 millidarcies, are suitable for the purposes of my invention. The formation should be of sufficient areal extent and thickness to accept the required amount of gas necessary to power the auxiliary equipment for the particular power plant. Such reservoirs may be porous and permeable sandstone beds, reefs or reef breccias confined, at least superjacently, by impermeable beds. The reservoir should also be such that lateral movement of the compressed air or other gas is restricted to the extent that it can be reclaimed. Such lateral restriction can be found in the case of folds, domes, faults or pinching out of permeable strata, reefs or reef breccias.

As previously pointed out, it is preferred in my invention that the subterranean reservoir be one which is capable of accepting the quantities of gas required to enable the integrated power plant to operate at maximum efficiency without substantially increasing or suffering a significant loss in pressure during withdrawal.

The invention herein described has the following advantages over the elevated surface water reservoir method of utilizing excess electrical energy and reclaiming it through the use of water turbines:

(a) The invention is not dependent on adequate topographic relief which is required in the elevated surface water system in order to acqure the required head of water to drive the turbine.

(b) Surface water reservoirs are frequently very expensive, difficult to construct and seal and give rise to evaporation losses, whereas underground reservoirs are found in widely dispersed areas of the United States. Because water is a valuable commodity, two surface reservoirs are generally required—one at a high elevation and the other at a low elevation so that water is conserved and readily available. An air storage peaking system, on the other hand, requires only one reservoir because atmospheric air is universally available. Moreover, it is practical to utilize a reservoir at some distance from the generating plant since the gas can be readily piped from the reservoir to the plant.

(c) In some areas where electrical power is generated there is inadequate water supply to support an elevated surface water system.

The present invention has the advantage over the use of mined or washed-out cavities in bedded or domed rock salt in that the per unit volume cost of creating salt cavity storage is several times more expensive than for developing porous rock or aquifer-type storage as shown on page 2, Section XXV, of Information Circular 77654, published December 1956 by the Bureau of Mines. Geographical distribution of salt beds or domes is also far more restricted than aquifer or porous rock strata and offer less availability. Porous rock reservoir storage in aquifers is more permanent and reliable than open underground cavity storage because of the inevitable tendency of roof collapse to occur when rock support is removed.

The preferred aquifer type storage of the present invention has the advantage over the use of mined or washed-out salt cavities in the earth as storage reservoirs in that in the latter, air or gas has to be pumped into the fixed volume reservoir which is at substantially atmospheric pressure and as a result loss of pressure is suffered until enough gas is pumped in to build the presure up to the injection pressure. Either the pressure in the cavity will have to be built up to considerably above the required pressure for driving the generating facilities, or only a small portion of the stored gas can be used because of the rapid drop in pressure upon withdrawal of the gas from the cavity. On the other hand, where the gas is stored against natural hydrostatic pressure, storage pressures will be at a finite level adequate to drive gas turbines, air motors or electrical generating equipment and injection and withdrawal of gas from the rock will not significantly vary the existing pressure of the reservoir.

The following example shows the cost of developing gas storage in an underground aquifer for a practical auxiliary power installation to take care of peak loads.

Assume:

Working pressure—715 p.s.i.g.
Peak day withdrawal—650MM cu. ft.

Then:

Gas unit weight of air=0.075 lb./cu. ft.
Weight of 650MM cu. ft.$=6.5\times 10^8 \times 0.075 = 48.7 \times 10^6$ lbs./day
Average lbs. per hr. of air required$=48.7 \times 10^6 \div 24 = 2.03 \times 10^6$
Pressure differential to expander=700 lbs. per sq. in. (pressure of gas above atm.)$\times 144$ (sq. in./sq. ft.)$\div 0.075$ (wt. of 1 cu. ft. of gas)$=1.34 \times 10^6$ feet of gas
Average gas horsepower at 70% efficiency$=2.03 \times 10^6 \div 60$ (min./hr.)$\times (1.34 \times 10^6 \div 33000) \times 0.70 = 9.618 \times 10^5$
Average kw. output$=9.618 \times 10^5 \times 0.746 = 717,500$ A reservoir can be safely operated on a 9 to 1 cushion-to-working gas ratio. Thus, if this storage is used three hours per day to supply auxiliary power, 650MM c.f.÷8 or 81MM c.f. of gas will be withdrawn thus necessitating a reservoir capacity of 810MM c.f. At $0.53 per M c.f. (published cost for development of gas storage of this type), the cost for the reservoir would be $429,000 or $0.58 per kw. as compared with 40% of $85–$150 kw. (published figure) for hydro-storage construction costs.

In addition to the advantages previously mentioned, my invention provides a reservoir that automatically expands and contracts to the desired volume without significant pressure change.

The reservoir is always at high pressure at the time it is being filled and therefore a high amount of energy is expended to fill the reservoir during short periods when excess capacity (low load) is available. This aids in stabilizing the load on the system.

Moreover, during storage the gas becomes saturated with water vapor and as a result the horsepower produced will be greater than that required to inject relatively dry air into the formation.

It will be seen, therefore, that I have proved a method and system for providing power at much lower cost than is possible by presently known methods, due to the low cost of storage and the increased power output of the stored gas.

I claim:

1. The method of conserving energy comprising:
   (a) generating electrical power,
   (b) utilizing at least part of the generated power during periods of less than peak load power requirement to compress gas to a pressure just sufficient to inject it into a reservoir hereinafter described,
   (c) injecting the compressed gas in a porous subterranean aquifer reservoir having a gas impermeable cap rock, said aquifer existing under natural hydrostatic pressure of about 250 to 3,000 pounds per square inch and having a gas storage capacity in excess of that required to meet peak load requirements without increasing the pressure of the reservoir above its natural hydrostatic pressure,
   (d) intermittently between periods of gas injection withdrawing stored gas from said reservoir, as required for generation of additional electrical power under the natural pressure of the reservoir, and
   (e) utilizing the withdrawn gas to generate such additional electrical power required,
   (f) said injection and withdrawal being carried out without significantly changing the natural reservoir pressure.

2. The method in accordance with claim 1 in which:
   (g) the gas is injected and withdrawn from the aquifer through separate conduits.

3. The method in accordance with claim 2 in which:
   (h) the aquifer has a porosity of not less than about 10 percent and a permeability not less than about 5 millidarcies.

4. The method in accordance with claim 3 in which the gas is air.

5. A system for conserving energy comprising:
   (a) above surface electrical power generating facilities,
   (b) means to supply energy to operate said facilities at below peak load requirement of said facilities,
   (c) a subterranean aquifer storage reservoir having a natural hydrostatic pressure between about 250 and 3,000 pounds per square inch, said reservoir having enough capacity to receive and store sufficient gas under the natural hydrostatic pressure of the reservoir to furnish additional energy requirement to operate said facilities intermittently at peak load as required,
   (d) means, including said facilities, for intermittently injecting gas into said reservoir during periods of less than peak load requirement, at a pressure just sufficient to overcome the natural hydrostatic pressure of said reservoir, and
   (e) means for intermittently withdrawing said gas from said reservoir under natural hydrostatic pressure and utilizing it to generate additional electrical power, during periods when said energy supply means are insufficient to meet the required electrical power load.

6. A system in accordance with claim 5 in which
   (f) the storage reservoir is an aquifer having a porosity between 10 and 40 percent, a permeability between 5 and 50,000 milliadarcies, and a pressure of about 250 to 300 lbs. per square inch.

References Cited

UNITED STATES PATENTS

| | | | |
|---|---|---|---|
| 2,433,896 | 1/1948 | Gay | 290—2 |
| 3,151,250 | 9/1964 | Carlson | 290—52 |

OTHER REFERENCES

Electrical World, January 1951, pp. 64–65.

G. R. SIMMONS, Primary Examiner

U.S. Cl. X.R.

166—305; 290—54, 43

UNITED STATES PATENT OFFICE
CERTIFICATE OF CORRECTION

Patent No. 3,523,192

August 4, 1970

William J. Lang

It is certified that error appears in the above identified patent and that said Letters Patent are hereby corrected as shown below:

Column 2, line 17, "greately" should read -- greatly --. line 25, "of" should read -- or --. Column 3, line 28, "excees" should read -- excess --. Column 6, line 47, "300" should read -- 3,000 --.

Signed and sealed this 2nd day of March 1971.

(SEAL)
Attest:

Edward M. Fletcher, Jr.
Attesting Officer

WILLIAM E. SCHUYLER, JR.
Commissioner of Patents